United States Patent
Gonda et al.

(10) Patent No.: US 9,919,744 B2
(45) Date of Patent: Mar. 20, 2018

(54) SHELL STRUCTURE COMPRISING FORCE TRANSMISSION POINT

(71) Applicant: Bayerische Motoren Werke Aktiengesellschaft, Munich (DE)

(72) Inventors: Mihaly Gonda, Unterschleissheim (DE); Thomas Schnaufer, Oberhausen (DE); Juergen Lenz, Fahrenzhausen (DE); Andreas Beil, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/802,276

(22) Filed: Jul. 17, 2015

(65) Prior Publication Data

US 2016/0016613 A1 Jan. 21, 2016

Related U.S. Application Data

(63) Continuation of application No. PCT/EP2014/050292, filed on Jan. 9, 2014.

(30) Foreign Application Priority Data

Jan. 18, 2013 (DE) ........................ 10 2013 200 699

(51) Int. Cl.
*B62D 25/00* (2006.01)
*F16B 5/02* (2006.01)
(Continued)

(52) U.S. Cl.
CPC .............. *B62D 25/00* (2013.01); *B60R 22/18* (2013.01); *F16B 5/02* (2013.01); *B60R 2022/1806* (2013.01); *F16B 11/006* (2013.01)

(58) Field of Classification Search
CPC .......... B62D 25/00; F16B 5/02; F16B 11/006; B60R 22/18; B60R 2022/1806
See application file for complete search history.

(56) References Cited

U.S. PATENT DOCUMENTS 3,458,233 A 7/1969 Kell
5,787,662 A 8/1998 Danz
(Continued)

FOREIGN PATENT DOCUMENTS

AT 11 215 U1 6/2010
CN 1412061 A 4/2003
(Continued)

OTHER PUBLICATIONS

International Search Report dated Apr. 11, 2014 (Three (3) pages).
(Continued)

*Primary Examiner* — D Glenn Dayoan
*Assistant Examiner* — Melissa A Black
(74) *Attorney, Agent, or Firm* — Crowell & Moring LLP

(57) ABSTRACT

The invention relates to a shell structure having a force transmission point, wherein a force transmission structure is provided on the force transmission point, wherein the force transmission structure has a fitting element comprising a fastening element, wherein the fitting element is connected to the shell structure. According to the invention, the fitting element has a contact surface having the shell structure and the contact surface can be clamped with or is clamped with the shell structure.

18 Claims, 1 Drawing Sheet

(51) Int. Cl.
   *B60R 22/18*   (2006.01)
   *F16B 11/00*   (2006.01)

(56) References Cited

U.S. PATENT DOCUMENTS

| | | | | |
|---|---|---|---|---|
| 5,836,613 | A | * | 11/1998 | Saito .................... B60R 21/055 |
| | | | | 280/808 |
| 6,302,477 | B1 | | 10/2001 | Satou |
| 8,419,112 | B2 | * | 4/2013 | Matsuoka ............. B60R 13/025 |
| | | | | 296/1.08 |
| 2002/0190518 | A1 | | 12/2002 | Kang |
| 2003/0094804 | A1 | | 5/2003 | Yakata et al. |

FOREIGN PATENT DOCUMENTS

| | | |
|---|---|---|
| CN | 102149575 A | 8/2011 |
| CN | 202624143 U | 12/2012 |
| DE | 42 23 694 A1 | 1/1994 |
| DE | 696 11 885 T2 | 9/2001 |
| DE | 103 05 015 A1 | 9/2004 |
| EP | 0 774 587 A1 | 5/1997 |
| EP | 2 141 370 A1 | 1/2010 |

OTHER PUBLICATIONS

German Search Report dated Nov. 27, 2013, with Statement of Relevancy (Six (6) pages).
Chinese Office Action issued in Chinese counterpart application No. 201480003148.9 dated May 5, 2016, with English translation (Twelve (12) pages).
Chinese Office Action issued in Chinese counterpart application No. 201480003148.9 dated Jan. 10, 2017, with English translation (Fourteen (14) pages).

* cited by examiner

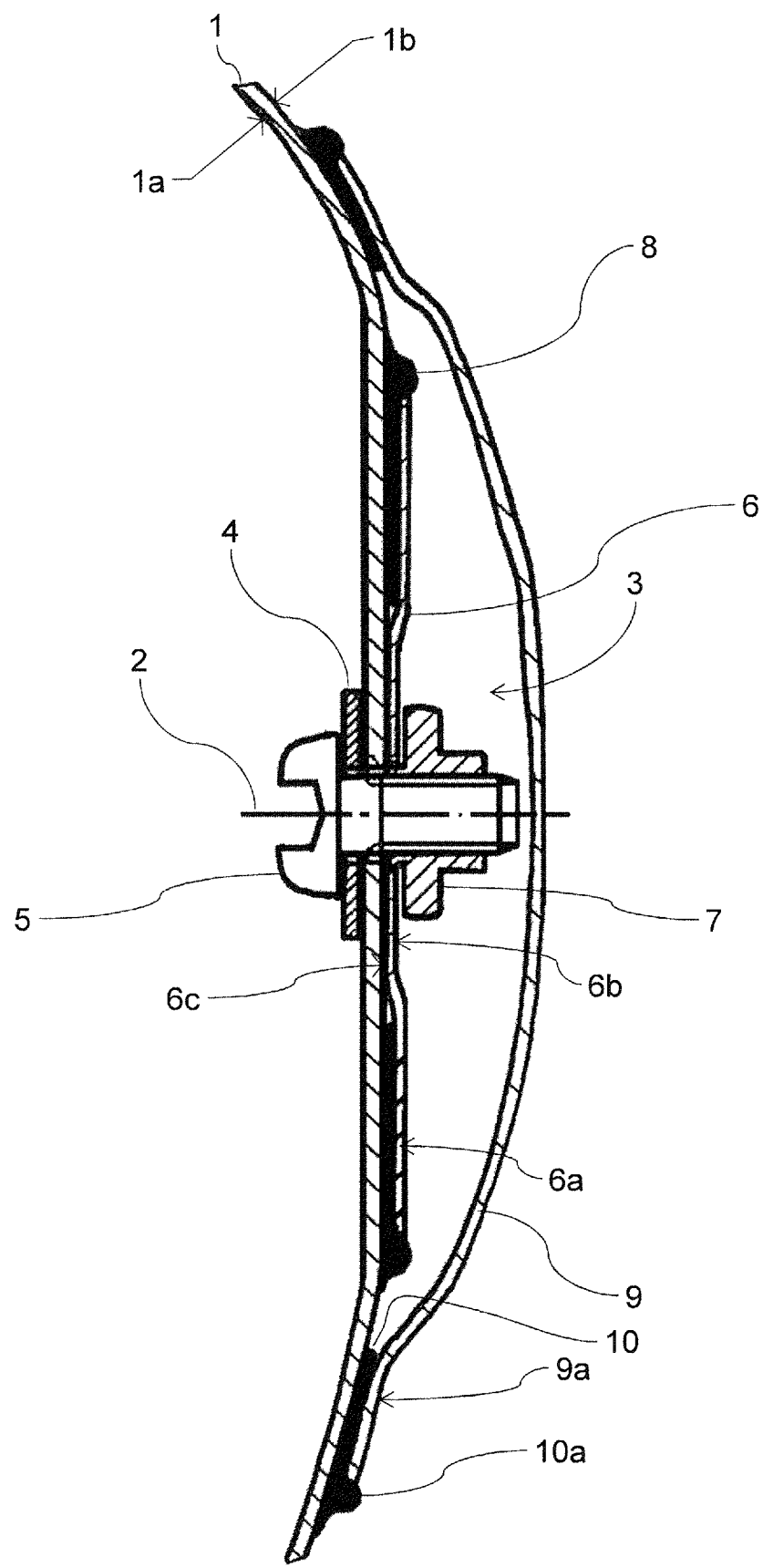

SHELL STRUCTURE COMPRISING FORCE TRANSMISSION POINT

CROSS REFERENCE TO RELATED APPLICATIONS

This application is a continuation of PCT International Application No. PCT/EP2014/050292, filed Jan. 9, 2014, which claims priority under 35 U.S.C. § 119 from German Patent Application No. 10 2013 200 699.3, filed Jan. 18, 2013, the entire disclosures of which are herein expressly incorporated by reference.

BACKGROUND AND SUMMARY OF THE INVENTION

The present invention relates to a shell structure having a force transmission point.

It is known to provide in components made of carbon fiber-reinforced plastic (CFRP), which are produced in a shell structure, force transmission points by connection elements integrated in the CFRP, such as a laminated nut. This process is connected with high expenditures of time and, as a rule, permits no subsequent change. In other words, after the lamination operation has been concluded, it will no longer be possible to integrate a connection element in the component. As a result, this process can currently not be presented with the required cycle time in component manufacturing for series production.

From the manufacturing of steel or aluminum vehicle bodies, it is known to implement screwed connections with a higher strength class by means of press-fit elements or welded elements (press-fit stud, press nut, weld stud, weld nut). In the case of CFRP components, this is often not possible because of high contact corrosion and limitations with respect to the permissible seating stress.

From German Patent Document DE 103 05 015 A1, a force transmission device is known for the fixing in or on a structural component as well as a structural component constructed by using at least one such force transmission device, which structural component is constructed for improving the mechanical characteristics and for a more cost-effective manufacturing as a hybrid component, with an insert made of metal, which is fixed in a structure made of plastic, the structure being designed for the fixing, for example, gluing into a recess, such as a plate-shaped impressing, of the structural component. The production of the fixing structure as well as the providing of the recess at the component require comparatively high expenditures. As a result of the recess, an elevated structure is created on the visible side of the component, which may be objectionable for esthetic and/or constructive reasons. Since the lateral dimension of the fixing structure is also limited for reasons of weight, the force transmission is comparatively punctiform and the forces that can be transmitted are limited. In addition, moisture may possibly penetrate into the interior of the component through the threaded hole.

It is an object of the present invention to provide a shell structure having a force transmission point which at least partly avoids the disadvantages of the prior art. In particular, it is an object of the present invention to create a force transmission structure on CFRP components with higher strength, with a lower probability of damaging the latter, while reducing corrosive disadvantages and with a distributed force transmission into the CFRP component for an industrialized application with high piece numbers. It is a further object of the invention to simplify a force transmission structure with respect to construction and manufacturing and to permit greater transmissible forces. Another further object of the invention consists of making the penetration of moisture through the force transmission point more difficult.

According to the invention, a shell structure is suggested which has a force transmission point, a force transmission structure being provided at the force transmission point, the force transmission structure having a fitting part with a fastening element, the fitting part being connected with the shell structure, and, in addition, the fitting part has a contact surface with the shell structure and the contact surface can be braced or is braced with the shell structure.

For the purpose of the invention, a shell structure is a structure that is part of a surface-type, curved or plane or partially curved and partially plane formation. Surface-type means that the structure thickness is much smaller than the remaining dimensions. For the purpose of the invention a force transmission structure is a structure which is designed and established for absorbing forces and guiding them into the shell structure. For the purpose of the invention, a fitting part is a spatial shape which provides the force transmission structure with dimension and stability. For the purpose of the invention, a fastening element is a device which is used for fastening a component, by way of which force is guided into the force transmission structure. For the purpose of the invention, a contact surface having the shell structure is to be understood such that the contact surface rests flatly against the shell structure. Flatly resting against the shell structure means that no elastic intermediate layers, such as an adhesive or the like, are present between the contact surface and the shell structure.

However, it is conceivable that a thin, at least essentially inelastic intermediate layer is provided, for example, for insulation purposes, for protection against corrosion or for transferring mechanical power, an inelastic intermediate layer being an intermediate layer which, when loaded by pressure, in comparison to the load transmission part or the shell structure, has an essentially insignificant deformation trajectory to being totally deformed. This means that here material properties, such as the modulus of elasticity, are not as important as the deformation path, which may be negligible in the case of an extremely thin intermediate layer. Such an intermediate layer may, for example, be a paint layer, a paper layer or plastic film. In other words, the resting against the shell structure should at least essentially permit a direct force transmission between the contact surface and the shell structure. Bracing the contact surface with the shell structure means that the contact surface is pressed firmly against the shell structure. This can, for example but not exclusively, be achieved by a screwed connection, a toggle closure, a wedging or other means. As a result of the resting against the shell structure and the bracing of the contact surface, a defined force transmission is implemented, and angular deviations can be avoided. The force is transmitted by way of a large surface, which reduces the surface pressure and, especially in the case of thin shell structures, reduces tensions to a bearable extent and thereby permits higher transmissible forces.

The invention is particularly advantageously applicable to a shell structure produced of fiber-reinforced plastic, particularly glass fiber-reinforced plastic (GFRP) or CFRP. Particularly in the case of fiber-reinforced plastics, the pulling-out risk of force transmission points is high, so that they can profit considerably from the invention.

In an embodiment of the invention the fitting part is made of metal, particularly iron or steel or aluminum or of an alloy with at least one of these metals. Particularly in the case of CFRP components, a problem often occurs concerning the contact corrosion with metals, which can be effectively reduced by the bracing and firm contact on the contact surface.

In a further embodiment of the invention, the fitting part is a sheet-shaped, plate-shaped or disk-shaped component, in which case the contact surface is caused by cold forming or cranking. Such manufacturing processes can be cost-effectively implemented and can be used in large-scale and mass production. As an alternative, the fitting part may also be a more massive, for example, but not exclusively, cast component with a turned-off, milled-off, planed-off or stripped shoulder, which forms the contact surface.

In a further embodiment of the invention, the fitting part is glued to the shell structure, in which case, the contact surface is free of adhesive. By means of the glued connection, the fitting part can be fixed at the desired location already before the bracing, which facilitates manufacturing. An additional stiffening of the shell structure and a further force transmission can also be achieved, which is distributed over a larger surface. Because the contact surface is free of adhesive, the positioning and bracing can also take place with high locating and positioning precision. When the gluing-together takes place in a large-surface and circumferential manner, a good sealing effect of the force transmission point can also be achieved.

In a further embodiment of the invention, the fitting part or the shell structure has a surface that juts back from the contact surface, which jutting-back is used for the gluing to the shell structure. When the shell structure has the jutting-back surface, the fitting part may have a simpler and less costly design. Since the production of the shell structure usually requires the production of a mold anyhow, a jutting-back surface or, inversely, a surface jutting forward to the fitting part may also be provided there. When the fitting part has the jutting-back surface, the component surface of the shell structure may be kept smooth. Also, the projection does not have to be provided in the mold, which also permits a subsequent providing of force transmitting points after the lamination of the shell structure. At the fitting part, the jutting-back surface may, for example, but not exclusively, be produced by a cold forming process, such as a deep-drawing process.

When the jutting-back surface forms a gap with the surface of the shell structure opposite the jutting-back surface at least in the area of the glued connection, which gap at least essentially has a uniform distance, the adhesive force can also be provided in a uniform manner.

The design can provide that the contact surface is at least essentially plane. This also requires that the opposite area of the shell structure is also plane in this area. By means of a plane surface, an axis position of the force transmission structure can also be precisely defined.

In a further embodiment of the invention. Thus, a visible side of the shell structure which faces the public, can be differentiated from a fitting side on which the fitting part is mounted. Thus, the visible side can be kept free of annoying elements, in which case, essentially only necessary linking points for the force transmission are provided on the visible side.

In a further embodiment of the invention, the contact surface is braced by way of the fastening element with a surface of the shell structure. This means that the fastening element is provided in the area of the contact surface. As a result, the fastening element is fixed in its location and position. The fastening element is also used for bracing the contact surface with the shell structure, so that no additional means are to be provided for the bracing.

As an alternative, it is conceivable to carry out the bracing by completely different means and to use the fastening element exclusively for the absorption of force.

In a further embodiment of the invention, the fastening element has a threaded element which is provided at the fitting part. For the purpose of the invention, a threaded element is a component which is connected with the fitting part or is integrated in it and has an internal or external thread or an internal thread formed therein or an external thread formed thereon.

In a further embodiment of the invention, the threaded element is fastened to the fitting part from a side of the fitting part situated opposite the contact surface, preferably connected with the fitting part, particularly pressed into a through hole formed in the fitting part. The threaded element can therefore be mounted where it has no negative effect.

When the threaded element has a bolt part, it is preferably designed such that the bolt part projects through an opening in the shell structure. When the threaded element has an internal thread, it is preferably designed such that it does not project beyond the contact surface. In the latter case, it is advantageous for the threaded element or the internal thread to be accessible through and opening in the shell structure. These two embodiment alternatives ensure that the threaded element is accessible and can be used from the visible side of the shell structure.

In a further embodiment of the invention, the fastening element has a press nut which, from a side of the fitting part situated opposite the contact surface, is pressed into a through hole designed in a section of the fitting part corresponding to the contact surface, and which does not project beyond the contact surface, wherein, by means of a screw, which is to be guided through an opening in the shell structure aligned with the press nut into the press nut, the contact surface can be braced or is braced with the shell structure, wherein by means of the screw, simultaneously a load absorption element for absorbing an external load can be fixed or is fixed on a side of the shell structure situated opposite the fitting part. This screwed connection concept permits more stable screwed connections with CFRP components without damaging them and without corrosive disadvantages and with a flat force transmission into the CFRP component for the industrialized application with high piece numbers.

In an advantageous further development of the invention, a covering is provided which covers the fitting part, the covering preferably being glued to that of the shell structure in a circumferential fashion. As a result, moisture which may possibly penetrate at the location of the force transmission point from the visible side onto the back side, can be caught and can also not contaminate a cavity which is closed off by the shell structure.

Particularly advantageously, the invention is, however, not exclusively applicable to a shell structure which is a vehicle body part, particularly of a motor vehicle.

Further characteristics, objects and effects of the invention are contained in the description and in the attached drawing. In this case, characteristics and details, which are described in connection with the device according to the invention, naturally also apply in connection with all modifications and in each case inversely and reciprocally, so that with respect to the disclosure of individual aspects and forms of the invention, reference is made or can always made reciprocally.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE is a schematic view of a screwed connection as an embodiment of the present invention.

DETAILED DESCRIPTION OF THE DRAWING

In the following, a preferred embodiment of the invention will be described by means of the attached drawing. The same component is always provided with identical reference symbols. Components and characteristics, purposes and effects, which are described with respect to the embodiment, to the extent that it not explicitly or obviously excluded, are assumed to be applicable in any modification and alternative embodiment and should also be considered to be disclosed with respect to the latter, even if they are not explicitly illustrated and/or described there. Furthermore, the drawing should be understood to be schematic and contains no limitations with respect to concrete dimensions or proportions in size, unless this is explicitly described.

The FIGURE illustrates a detail of a CFRP component 1 in which a force transmission point 2 is formed. The force transmission point 2 is constructed as a screwed connection, whose location is symbolized by a center line 2, and is implemented by an insert 3, which is connected with the component 1. In the illustrated embodiment, at the point defined by the center line 2, a belt buckle 4 is screwed to the insert 3 by means of the screw 5. The center line 2 defines a location of respective through bores (not marked in detail) in the component and in the belt buckle 4 and a screwed-connection axis of the insert 3.

According to the illustration in the FIGURE, the insert 5 has a plate 6 which in this embodiment is made of steel. The plate 6 has an edge area 6a and a countersinking 6a formed around the center line 2. The countersinking 6b is formed by cold forming, such as deep drawing, and, on the opposite side, forms an elevation with a contact surface 6c which rests against the component 1. The contact surface 6c is parallel to the surfaces of the edge area 6a.

In the area of the center line 2, a through hole (not shown in detail) is formed in the plate 6. The through hole may be a bore or alternatively may be formed by stamping, for example, simultaneously with the deep drawing of the countersinking 6b. A press nut 7 is mounted in the through hole in the countersinking 6b. The press nut 7 has a main body with a shaft part (not shown in detail) and a shoulder part (not shown in detail) that is widened in the contact area as well as a collar (not shown in detail). By means of a suitable pressing tool, the collar of the press nut 7 is pressed into the through hole of the plate 6 and has a firm physical connection with the material of the plate 6. On the contact side, the press nut 7 does not project beyond the contact surface 6c, and is therefore flush with the latter. Depending on the thickness of the plate 6, the press nut 7 may also draw back behind the contact surface 6c, i.e. disappear in the through hole.

In the edge area 6a, the plate 6 is glued to the component 1 by means of the adhesive layer 8. For this purpose, the adhesive layer 8 is applied to the edge area 6a in a thickness which is greater than a countersink depth of the countersinking 6b, and the plate 6 is subsequently placed on the back side 1b of the component 1, so that the press nut 7 is aligned with the center line 2, and is subsequently pressed on, so that the adhesive 8 connects itself with the component 1 and the plate 6. The pressing is dimensioned such that the contact surface 6c rests on the back side 1b of the component 1. Furthermore, the quantity and location of the adhesive are dimensioned such that a certain amount of adhesive emerges laterally from of the adhesive gap and forms a bead (not shown in detail) while the contact surface 6c remains free of adhesive toward the interior.

A covering 9 made of plastic in a size that is sufficient for covering the insert 3e together with the screw 5, is placed over the insert 3 and is glued in an edge area 9a by means of an adhesive layer 10 to the back side 1b of the component 1. As a result of the covering 9, moisture possibly penetrating through the press nut 7 can be kept away from a space bounded by the component 1. An adhesive bead 10a protects the cut edge of the covering 9.

During the assembly, the belt buckle 4 is placed on the visible side 1a of the component, so that a through bore provided therein is aligned with the through bore of the component 1. The screw 5 is then screwed in through the through bores of the belt buckle 4 and of the component 1 into the press nut 7 and is tightened. As a result, the contact surface 6c is firmly pressed against the back side 1b of the component 1 and is braced. By means of the contact surface 6c, a force transmitted by way of the fitting 3 is transmitted over a wide area into the component 1. The covering 9 further stiffens the component 1.

It is understood that the embodiment described above is purely presented as in example with respect to many details in order to explain the basic principle of the invention.

Instead of being produced of CFRP, the component 1 may also be made of GFRP or of any other material.

Instead of a through hole, a different opening, such as an oblong hole, may be provided in the component 1 in order to provide a certain adjustability.

The plate 6 may be made of any sufficiently solid material. Thus, instead of steel, aluminum or an alloy may also be used.

Instead of the press nut 7, a weld nut with or without welding projections and/or flange, a rivet nut, a jet log anchor nut, a threaded rivet, or any other suitable type of nut, which can be mounted on the back of the plate, can be used, or an extruded hole provided with an internal thread can be formed in the plate. If the through bore in the component 1 is sufficiently wide for accommodating a projection, instead of the press nut 7, a flanged nut, a rivet nut or the like can be used, a flange or a rivet collar being accommodated by the through bore in the component 1. When a nut component has a projection in the above-described manner, particularly when the through bore in the component 1 having this projection is designed to fit, a centering of the insert 3 with the through hole in the component 1, i.e. a precise alignment with the axis 2, can be facilitated.

Instead of a nut part, a screw part, such as a press bolt, a rivet bolt or the like, which projects through the through hole in the component 1, can be used. Such a screw part can then be used from the visible side 1a of the component 1 by means of a nut for fastening the belt buckle 4.

In the described embodiment, the plate 6 is constructed as a disk having a countersinking 6b. This shape is only an example. Instead of a disk, a metal sheet of a square, rectangular or strip-shaped blank can be used which has a countersinking or is cranked on one or two sides.

Instead of the plate 6 and the press nut 7, the insert 3 may have a one-piece component, such as a cast part, with an integrated nut thread. According to the invention, the contact surface 6c is important, which fixedly rests on the component 1 and is braced with the latter, so that a defined contact with the component 1 is ensured that is free of adhesive.

The covering 9 is optional. It is particularly advantageous in the case of components 1 that close off a cavity on their rearward side 1b.

It is understood that also the belt buckle 2 is only used as an example of any fastening element that can be screwed on.

The invention was described above by means of a preferred embodiment as well as several implementation variants, implementation alternatives and modifications and was illustrated in the FIGURE. These descriptions and representations are purely schematic and do not limit the scope of protection of the claims but are used only for illustrating respective examples. It is understood that the invention can be implemented and modified in multiple fashions without leaving the scope of protection of the claims.

For the purpose of the invention, the component 1 is a shell structure; the insert 3, which has the plate 6 and the press nut 7, form a force transmission structure; the plate 6 is a fitting part; the press nut 7 is a fastening element or a threaded element; the contact surface 6c is braced with the shell structure (component 1) by means of the screw 5 and the press nut 7; the edge area 6a forms a jutting-back surface; the belt buckle 4 is a load absorption element, and the glued connection forms a further connection of the fitting part (plate 6) with the shell structure (component 1).

A special embodiment of the invention is based on the idea that screwed connections on shell structures, particularly CFRP components of a higher strength class, can be presented by means of steel or aluminum inserts with press-in elements (press nut, press bolt). This screwed-connection concept permits higher-strength screwed connections with CFRP and similar components, without damaging them, without corrosive disadvantages and with a surface-type force transmission into the CFRP component for industrialized application with high piece numbers.

LIST OF REFERENCE NUMBERS

1 CFRP component
1a Visible side
1 Back side
2 Fastening point (screw-on axis)
3 Insert
4 Belt buckle
5 Screw
6 Plate
6a Edge area
6b Countersinking
6c Contact surface
7 Press nut
8 Adhesive
9 Covering
10 Adhesive The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A shell structure apparatus, comprising:
   a shell structure having a force transmission point, the shell structure coupled to a force transmission structure at the force transmission point so as to guide forces into the shell structure,
   wherein the force transmission structure has a fitting part with a fastening element, by way of which force is guided into the force transmission structure,
   wherein the fitting part is connected with the shell structure,
   wherein the fitting part is defined by a first side having a contact surface with the shell structure and the contact surface is configured to be braced with the shell structure,
   wherein an entirety of the first side of the fitting part is one of directly pressed against the shell structure or in adhesive contact with the shell structure.

2. The shell structure apparatus according to claim 1, wherein the shell structure is produced of one of glass fiber-reinforced plastic and carbon fiber-reinforced plastic.

3. The shell structure apparatus according to claim 1, wherein the fitting part is made of one of iron, steel, aluminum and an alloy thereof.

4. The shell structure apparatus according to claim 1, wherein the fitting part is one of a sheet-metal-shaped component, a plate-shaped component and a disk-shaped component, and wherein the contact surface is formed by cold forming or cranking.

5. The shell structure apparatus according to claim 1, wherein the fitting part is glued to the shell structure, the contact surface being free of adhesive.

6. The shell structure apparatus according to claim 1, wherein one of the fitting part or the shell structure includes a jutting-back surface that juts back from the contact surface, the jutting-back surface configured for a glued connection with the shell structure.

7. The shell structure apparatus according to claim 2, wherein one of the fitting part or the shell structure includes a jutting-back surface that juts back from the contact surface, the jutting-back surface configured for a glued connection with the shell structure.

8. The shell structure apparatus according to claim 6, wherein the jutting-back surface forms a gap with a surface of the shell structure opposite the jutting-back surface at least in the area of the glued connection, which gap at least essentially has a uniform distance.

9. The shell structure apparatus according to claim 7, wherein the jutting-back surface forms a gap with a surface of the shell structure opposite the jutting-back surface at least in the area of the glued connection, which gap at least essentially has a uniform distance.

10. The shell structure apparatus according to claim 1, wherein the contact surface is at least essentially plane.

11. The shell structure apparatus according to claim 1, wherein the fastening element is configured to fastening a load absorption element for the absorption of an external load, the absorption of the load at the load absorption element taking place on a side of the shell structure which is situated opposite that side at which the fitting part is connected with the shell structure.

12. The shell structure apparatus according to claim 1, wherein the contact surface is braced by way of the fastening element with a surface of the shell structure, the fastening element having a threaded element which is provided at the fitting part.

13. The shell structure apparatus according to claim 12, wherein, from a side of the fitting part situated opposite the contact surface, the threaded element is fastened to the fitting part and pressed into a through hole constructed in the fitting part.

14. The shell structure apparatus according to claim 12, wherein the threaded element has one of a nut thread that does not project beyond the contact surface, and a bolt part preferably projects through an opening in the shell structure.

15. The shell structure apparatus according to claim 13, wherein the threaded element has one of a nut thread that does not project beyond the contact surface, and a bolt part preferably projects through an opening in the shell structure.

16. The shell structure apparatus according to claim 1, wherein the fastening element has a press nut which, from a side of the fitting part situated opposite the contact surface, is pressed into a through hole constructed in a section of the fitting part corresponding to the contact surface, and which does not project beyond the contact surface, wherein, by means of a screw, which is to be guided through an opening in the shell structure into the press nut, wherein the contact surface is configured to be braced with the shell structure, and wherein, simultaneously a load absorption element for absorbing an external load is configured to be fixed by the screw on a side of the shell structure situated opposite the fitting part.

17. The shell structure apparatus according to claim 1, wherein a covering is configured to cover the fitting part, the covering being glued to the shell structure in a circumferential manner.

18. The shell structure apparatus according to claim 1, wherein the shell structure is a body part of a motor vehicle.

* * * * *